(12) United States Patent
NadimpalliRaju et al.

(10) Patent No.: US 7,787,270 B2
(45) Date of Patent: Aug. 31, 2010

(54) DC-DC AND DC-AC POWER CONVERSION SYSTEM

(75) Inventors: Ravisekhar NadimpalliRaju, Clifton Park, NY (US); Richard S. Zhang, Rexford, NY (US); Rajib Datta, Niskayuna, NY (US); Allen Michael Ritter, Roanoke, VA (US); Ljubisa Dragoljub Stevanovic, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 300 days.

(21) Appl. No.: 11/810,825

(22) Filed: Jun. 6, 2007

(65) Prior Publication Data

US 2008/0304296 A1 Dec. 11, 2008

(51) Int. Cl.
*H02M 7/10* (2006.01)
(52) U.S. Cl. .......................... 363/68; 363/37
(58) Field of Classification Search .................. 363/34, 363/36–37, 65, 67–71
See application file for complete search history.

(56) References Cited

U.S. PATENT DOCUMENTS

| | | | | |
|---|---|---|---|---|
| 3,517,300 | A | 6/1970 | McMurray | 363/25 |
| 5,311,419 | A * | 5/1994 | Shires | 363/65 |
| 5,943,229 | A | 8/1999 | Sudhoff | 363/125 |
| 5,982,645 | A * | 11/1999 | Levran et al. | 363/37 |
| 6,320,767 | B1 * | 11/2001 | Shimoura et al. | 363/37 |
| 6,747,881 | B2 * | 6/2004 | Schreiber | 363/37 |
| 6,879,062 | B2 | 4/2005 | Oates | 307/140 |
| 6,967,854 | B2 * | 11/2005 | Lai et al. | 363/65 |
| 7,518,886 | B1 * | 4/2009 | Lai et al. | 363/17 |
| 2007/0170900 | A1 * | 7/2007 | Lee | 323/260 |

FOREIGN PATENT DOCUMENTS

WO WO 01/71897 9/2001

OTHER PUBLICATIONS

Laimer, et al., "Zero-Ripple EMI Input Filter Concepts for Application in a 1-U 500kHz Si/SiC Three-Phase PWM Rectifier", IEICE/IEEE Intele C '03, Oct. 19-23, 2003, pp. 750-756.*
A Power Electronic-Based Distribution Transformer, Edward R. Ronan, Scott D. Sudhoff, Steven F. Glover, Dudley L. Galloway, IEEE Transactions on Power Delivery, vol. 17, No. 2., Apr. 2002.
Analysis and Design of Electronic Transformers for Electric Power Distribution System, Moonshik Kang, Prasad N. Enjeti, Ira J. Pitel, IEEE Transactions on Power Electronics, vol. 14, No. 6, Nov. 1999.

(Continued)

*Primary Examiner*—Jeffrey L Sterrett
*Assistant Examiner*—Fred E Finch, III
(74) *Attorney, Agent, or Firm*—Penny A. Clarke

(57) ABSTRACT

A galvanic isolated DC-DC and DC-AC power conversion system is coupled to a plurality of DC sources which are derived from a combination of a plurality of single-phase and three-phase AC-DC converters. The DC-DC and DC-AC power conversion system in one embodiment is configured to provide mixed type outputs (mixed frequency, e.g. DC with 50 or 60 Hz, with 400 Hz; mixed voltage levels).

23 Claims, 7 Drawing Sheets

OTHER PUBLICATIONS

An Actively Cooled High Power, High Frequency Transformer With High Insulation Capability, Lothar Heinemann, ABB High Voltage Products, IEEE IAS Conference 2002.

Multilevel Intelligent Universal Transformer for Medium Voltage Applications, Jih-Sheng Lai, Arindam Maitra, Arshad Mansoor, Frank Goodman, IEEE IAS Conference 2005.

Design Considerations for a Medium Frequency Transformer in a Line Side Power Conversion System, Tommy Kjellqvist, Staffan Norrga, Stefan Ostlund, IEEE Power Electronics Specialists Conference 2004.

Configurable Front-End Converters for Multicurrent Locomotives Operated on 16 2/3 Hz AC and 3 kV DC Systems, Alfred Rufer, Nikolaus Schibli, Christophe Chabert, Claudio Zimmermann, IEEE Transactions on Power Electronics, Sep. 2003.

eTransformer to Revolutionize Train Design, Article from Alstrom Website, 2003.

Alstrom's "eTransformer" Makes Trains Lighter and Frees Up Space, Innotrans 2004.

15 kV/16.7 Hz Energy Supply System with Medium Frequency Transformer and 6.5 kV IIBTs in Resonant Operation, B. Engel, M. Victor, G. Bachmann, A. Falk, EPE Conference 2003.

Medium Frequency Transformer for Traction Applications making use of Multilevel Converter: Small Scale Prototype Test Results, Mauro Carpita, Marc Pellerin, Joel Herminjard, SPEEDAM Conference 2006.

Light Transformers for Kilowatt SMPS Based on Nanocrystalline Softmagnetic Cores, M. Ferch, IEE PEVSD Conference 1998.

* cited by examiner

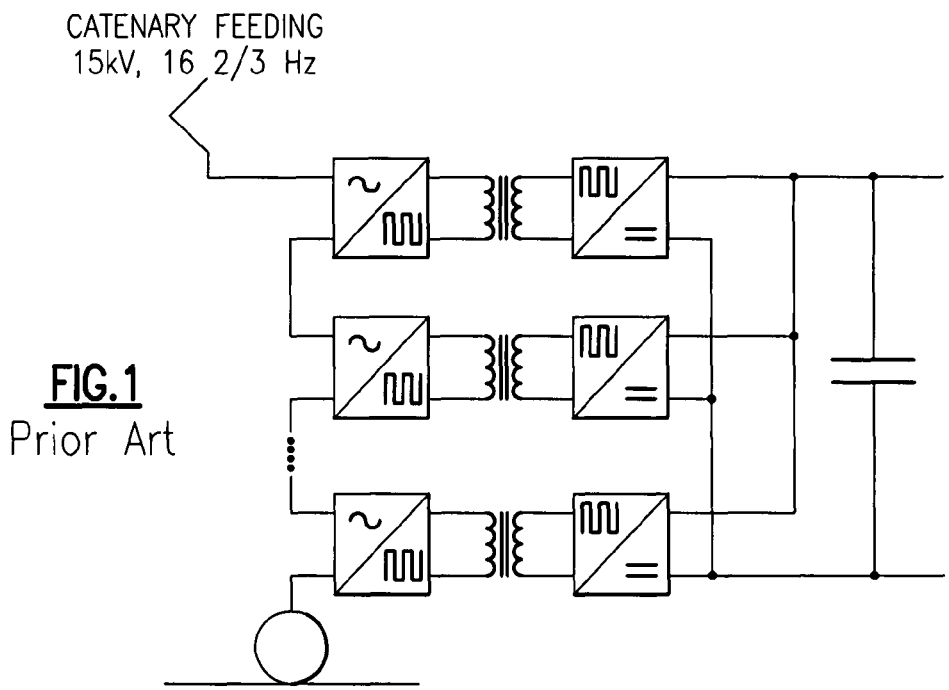
FIG. 1
Prior Art
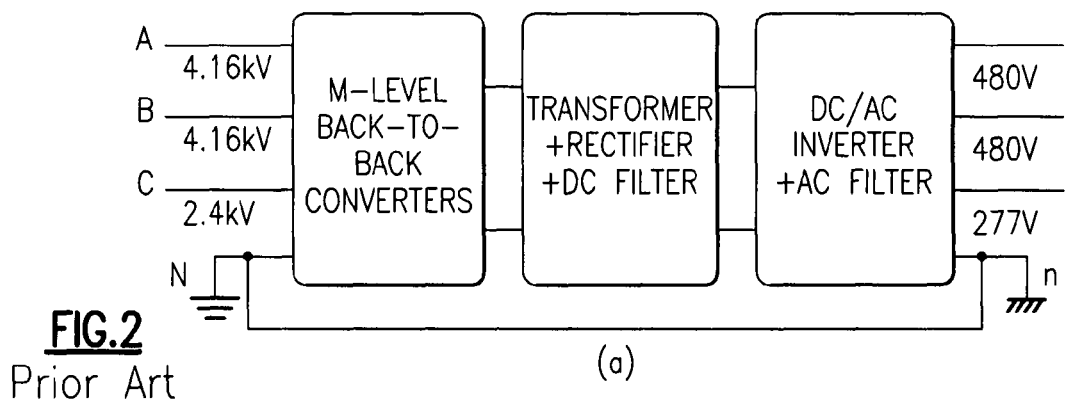
FIG. 2
Prior Art
(a)
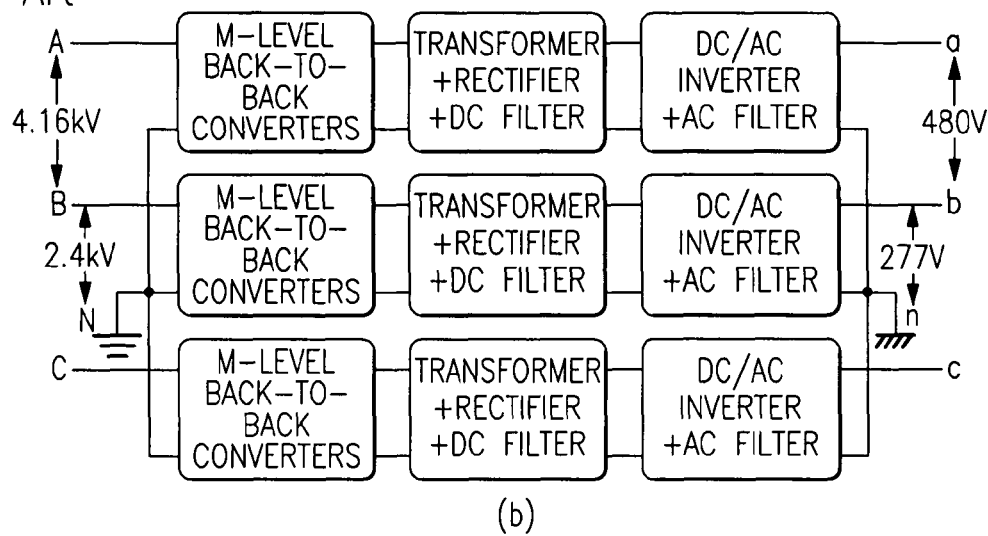
(b)

DC-DC AND DC-AC POWER CONVERSION SYSTEM

BACKGROUND

The present invention is directed to power electronics, and more particularly to a DC-DC and DC-AC power conversion system with galvanic isolation and with DC input voltages derived from a combination of three single-phase and three-phase AC-DC converters.

The low power density of conventional electrical systems has been a significant barrier to the deployment of 'more electric' systems for particular classes of ships. Improvements in power densities that are achieved by advanced turbines and generators are often diluted by the need for bulky ancillary equipment, such as transformers.

Many modern power systems require large and heavy 50 Hz or 60 Hz conventional transformers. The weight and volume of these transformers is a major barrier to the development of expanded electrical capabilities associated with certain future power system applications.

High frequency "solid state transformers", which are form, fit and functional replacements of bulky line frequency iron core transformers have drawn considerable interest for utility distribution systems and locomotive applications. The Intelligent Universal Transformer (IUT) program launched by the Electric Power Research Institute (EPRI), and medium frequency transformer prototype demonstrations by Bombardier, ABB, and Deutsche Bahn for locomotive application, represent examples of state-of-the-art research in this area.

Architectures proposed for these electronic transformers have centered on using cascaded converter blocks or multi-level neutral point clamped (NPC) converters to handle the high voltages on the primary side.

FIG. 1 exemplifies the large number of cells, or levels, required in these cascaded converter block architectures. These architectures are disadvantageous in that they inherently necessitate a high level of complexity and part count. A large number of cascaded cells are required with this approach due to limited voltage ratings of available Si semiconductors.

FIG. 2 exemplifies the large number of cells, or levels, required in a multi-level NPC converter block architecture. The architecture illustrated in FIG. 2 utilizes a HV-IGBT-based multi-level NPC converter configuration on the primary side. The limited voltage rating and switching frequency of current high voltage IGBTs result in a large component count and low system performance.

High power density solid-state electronics transformers for solid-state power substations (SSPS) provide functionalities beyond a conventional line frequency iron core transformer. These functionalities include: (1) step up or down voltage level with galvanic isolation between low frequency input and output, which is the function of a conventional line frequency transformer, with a much higher power density resulted from intermediate high frequency isolation transformer; (2) ability to convert output frequency, e.g. get DC or 60 Hz or 400 Hz power at the output from 50 Hz or 60 Hz input power; (3) generate multiple outputs at different frequencies and voltage levels; and (4) provide advanced control functions for entire power system, such as reactive power compensation, voltage regulation, and active harmonic filtering, active damping etc.

Emerging SiC devices, e.g. SiC MOSFET, SiC BJT, SiC Schottky, PiN and JBS diodes, etc. offer application benefits, such as lower conduction and switching losses, higher voltage and higher temperature capabilities than their counterparts of Si devices. Those features are critical to implementation of a high density high frequency medium voltage SSPS. However, those SiC devices presently have a yield that is lower than Si devices, and a cost that is higher than Si devices. Significant challenges remain to developing such a smaller solid state electronics transformer for a solid-state power substation (SSPS). These include, but are not limited to:

Conventional high power converter topologies, such as multi-level NPC converters, present significant design challenges at high frequencies due to complex device interconnections and packaging. Parasitic inductances can lead to increased electrical stresses and degradation of performance;

Thermal management of high frequency transformers is a major challenge due to their reduced size;

Passive components, such as DC bus capacitors, input and output filters, and contactors can limit power densities. Minimizing the use of such devices is critical;

Multiple cascaded power conversion stages can reduce the SSPS efficiency; and

Device count should be minimized to account for yield constraints of early SiC devices.

In view of the foregoing, it would be both advantageous and beneficial to provide a DC-DC and DC-AC power converter that is suitable for implementing a power conversion system (i.e. solid-state power substation (SSPS)) including controls to minimize all passive components associated with the SSPS.

BRIEF DESCRIPTION

The present invention is directed to a galvanic isolated DC-DC or DC-AC power conversion system that is coupled to a plurality of DC sources which are derived from a combination of a plurality of single-phase and three-phase AC-DC converters.

The DC-DC or DC-AC converters including a rectification stage at the secondary side of a high frequency transformer, in one embodiment, together comprise a mixed silicon-carbide (SiC) and silicon (Si) device topology.

Each galvanically isolated DC-DC or DC-AC converter, in another embodiment, comprises a pulse width modulated H-bridge with all silicon carbide (SiC) power switches or mixed SiC and Si power switches.

The galvanic isolated DC-DC or DC-AC power conversion system in still embodiment is configured to provide mixed type outputs (mixed frequency, e.g. DC with 50 or 60 Hz, with 400 Hz; mixed voltage levels).

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein:

FIG. 1 illustrates an electronic transformer architecture that employs cascaded converter blocks to handle high voltages on the primary side, and that is known in the art;

FIG. 2 illustrates an electronic transformer architecture that employs a multi-level NPC converter block architecture, and that is known in the art;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 3:
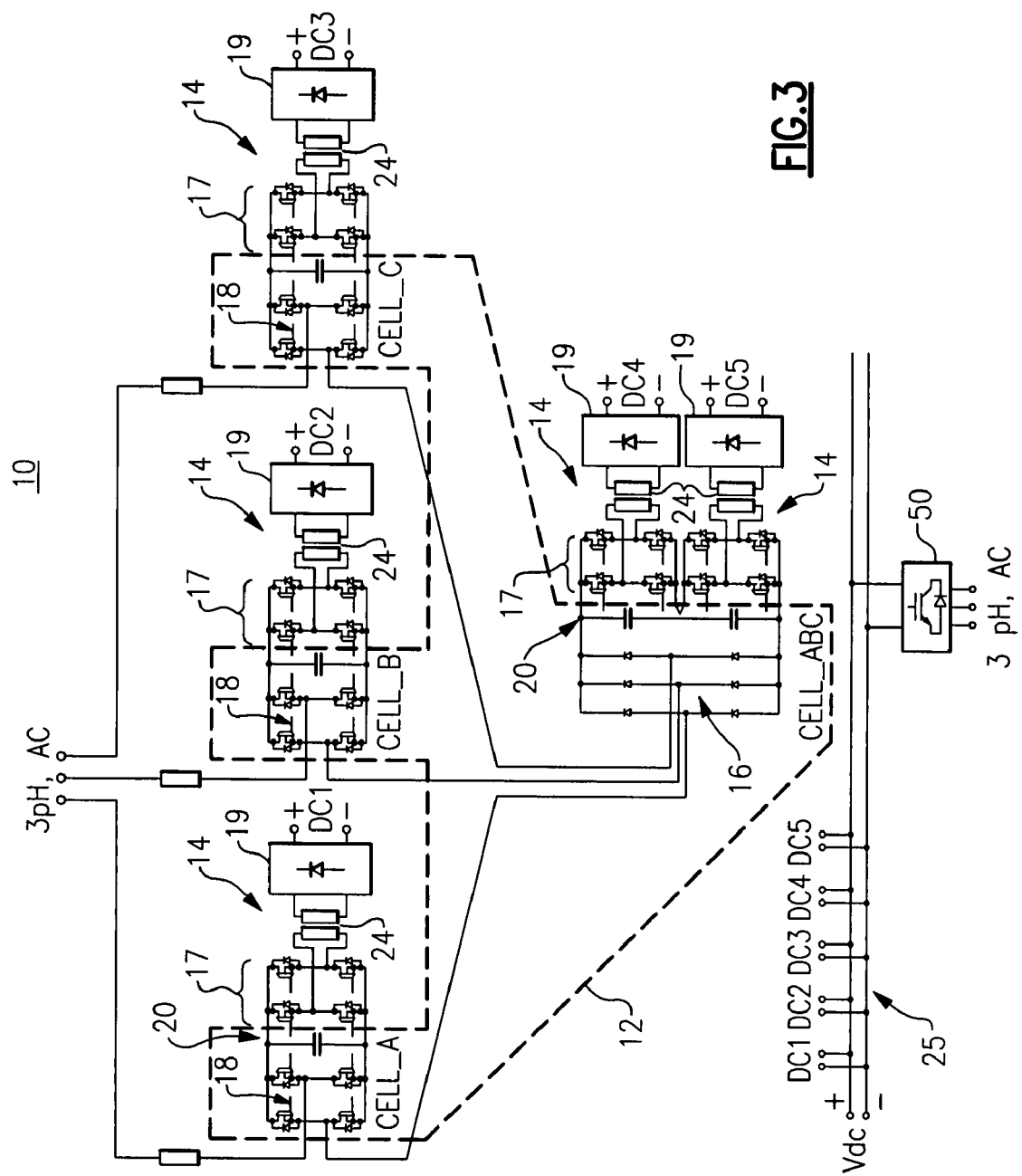
FIG. 3 illustrates a power conversion system (solid-state power substation (SSPS)) using a plurality of DC-DC power converters, according to one embodiment of the present invention.

FIG. 3 illustrates a power conversion system (solid-state power substation (SSPS)) 10 that employs a plurality of modular DC-DC and DC-AC power converters, each including a high frequency galvanic isolation transformer 24, to provide a form and fit replacement for a conventional iron core transformer. The power conversion system 10 embodiment illustrated in FIG. 3 is based upon 1) rectification of high voltage AC to high voltage DC links by using a Si SCR or diode bridge 16 combined with SiC MOSFET H-bridges 18; 2) modular SiC MOSFET H-bridge DC-DC converters 14 inverting high voltage DC links to high frequency AC links; 3) modular high frequency transformers 24 coupled to the high frequency AC links; 4) rectifiers 19 at the secondary side of the high frequency transformers 24 to create a DC bus 25; and 5) output power block 50 to construct a desired AC voltage output signal.

Each DC-DC converter 14 can be seen to include a modular H-bridge DC-DC power converter with a galvanic isolation high frequency transformer 24. The outputs of these DC-DC power converters 14 can be placed in parallel to provide a fault tolerant DC bus 25, as shown in FIG. 3. The present invention is not so limited however, and it shall be understood that the power conversion system 10 can provide numerous combinations of output voltages and types of output voltages, depending only on where the output voltage is generated by the power conversion system 10. Different DC voltages can be generated, for example, by changing the turns ratio of one or more transformers 24. Direct AC inversion can be use to generate single-phase AC voltage, which results from a sinusoidal high frequency modulated waveform at the transformer 24 and filtering action with leakage inductance of the high frequency transformer (and/or with additional inductance) and the DC link capacitor of the direct AC inverter described herein below with reference to FIG. 5. The low frequency modulated, e.g. half sinusoidal DC voltage at the DC link of the direct AC inverter is unfolded to obtain the ultimate low frequency AC output. Three-phase AC voltage can be obtained with three sets of the circuit depicted in FIG. 5. Mixed multiple types of outputs (DC only, DC w/60 Hz w/400 Hz outputs, . . . , etc.) can thus be provided using the techniques described above. A separate DC-AC converter can also be added onto the common DC link 25 to provide a functional replacement of a conventional transformer.

Figure 4:
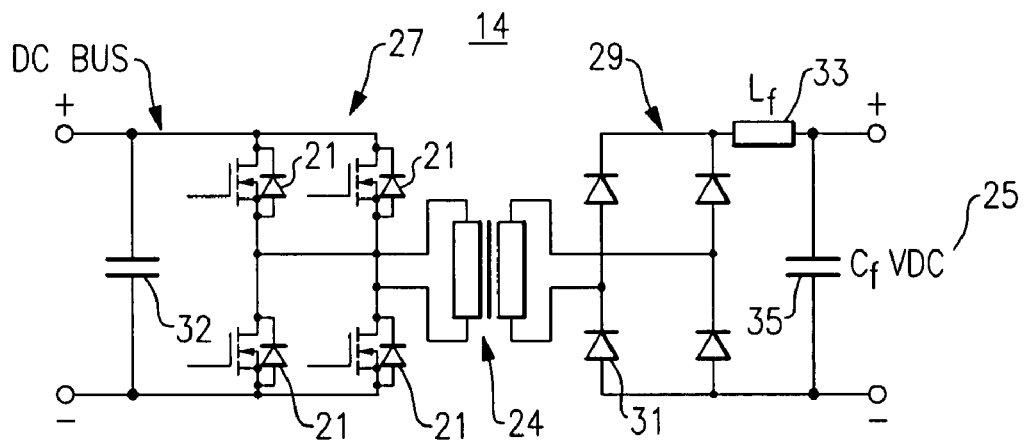
FIG. 4 is a schematic diagram illustrating more detail of a single DC-DC power converter architecture for one of the DC-DC power converters shown in FIG. 3.

FIG. 4 is a schematic diagram illustrating in more detail, a single DC-DC converter 14. Each DC-DC converter 14 includes a SiC MOSFET full bridge 27 coupled to an Si or SiC diode bridge 29 through a high frequency galvanic isolation transformer 24. The transformer 24 outputs are rectified via a set of Si fast recovery diodes 31 or SiC Schottky diodes, and then filtered via a reactor/inductor 33 and a filter capacitor 35 to provide a DC output.

DC-DC converter 14 in one embodiment employs a SiC MOSFET H-bridge topology common to all DC-DC converters 14, and also common to other portions of the power conversion system 10. This simple H-bridge building block was found by the present inventors to enable a topology having minimized commutation loops and parasitic inductance. These features can be important since tight packaging and integration of the modules are important for high frequency operation with minimized electrical and EMI stresses.

The H-bridge based DC-DC converter 14 can be readily adapted for phase-shifted soft-switching if MOSFET and antiparallel diode 21 switching losses prove to be unacceptable with hard-switched operation. Multi-level NPC converters would require significant modifications to accommodate such soft-switched operation, and thus are disadvantageous when compared with the H-bridge based DC-DC converter 14. The phase-shifting technique employed exploits parasitic circuit elements, such as device capacitances, to provide low-loss switching transitions without the need for additional components. Suitable phase-shifting techniques are widely used in commercial DC-DC power supplies, and so phase-shifting techniques will not be discussed in detail herein.

The DC-DC converter 14 topology also advantageously leads to the use of modular lower power high frequency transformers 24. This feature allows easier procurement and manufacturing of magnetic cores because processing of high frequency and high power magnetic cores, such as nanocrystalline material, for large cores is a significant challenge.

The foregoing modular high frequency transformers 24 can have higher power density than a single transformer solution due to distributed thermal management and less insulation requirements.

Ripple power drawn by a single phase SiC H-bridge 18 in the AC-DC stage 12 flows through its corresponding DC-DC converter 14 without having to buffer the ripple power on the high voltage DC bus 20. The size and weight of the high voltage DC link capacitor 32 can therefore be dramatically reduced.

The DC-DC converter 14 can also be controlled with respect to every other DC-DC converter 14 by interleaving multiple threads to minimize switching frequency ripple and thus the size and weight of the output filters 33, 35. Further, phase shifting techniques associated with the DC-DC converter output can be implemented to achieve soft switching, reduced EMI, and high performance. Interleaving and phase shifting are well known in the digital and analog arts, and so are not discussed in further detail herein to preserve brevity and enhance clarity.

Those skilled in the diode art will understand that losses due to reverse recovery of body diodes (i.e. SiC MOSFET) and antiparallel diodes (PiN or JBS) can be significant. The SiC MOSFETs may be operated in a synchronous rectifier mode to further improve their efficiency. Operating the SiC MOSFETs in a synchronous rectifier mode will alleviate the necessity to employ antiparallel diodes in the SiC modules.

Figure 5:
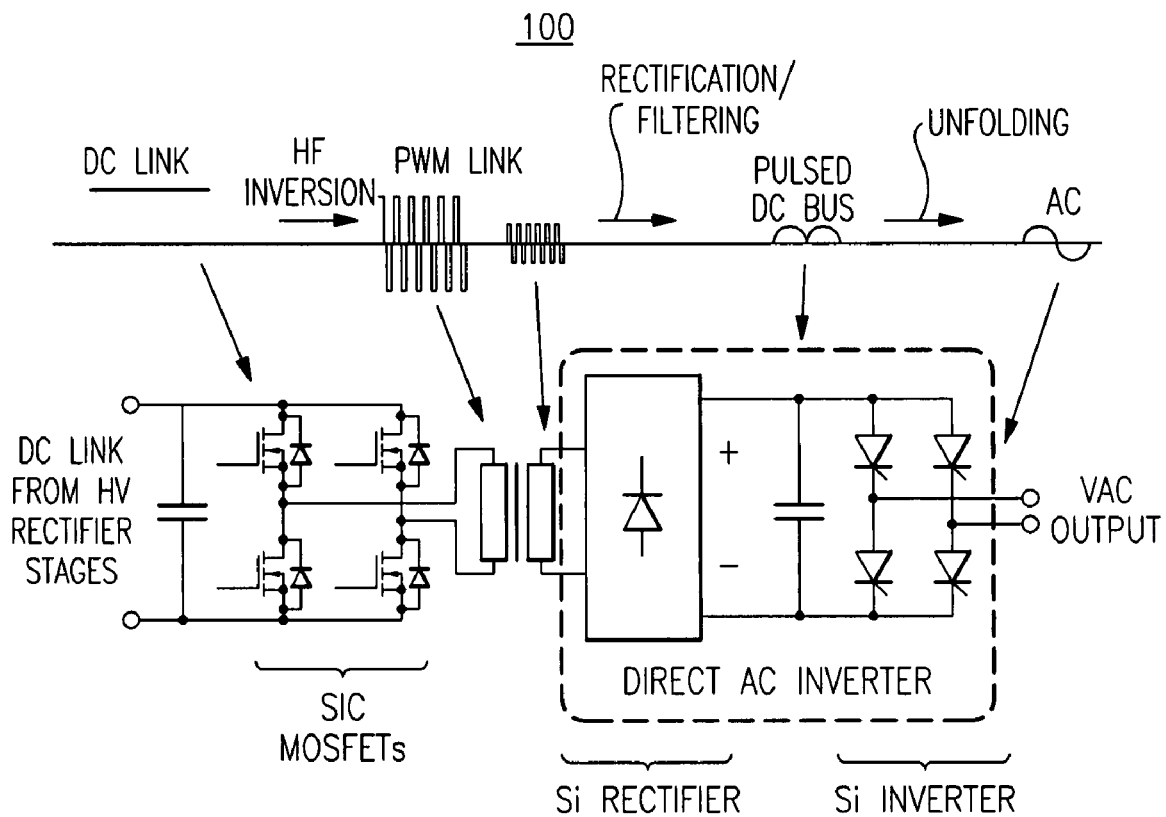
FIG. 5 illustrates a direct AC inversion to generate single-phase AC voltage, which results from a sinusoidal high frequency modulated waveform at the transformer shown in FIG. 4 and filtering action with leakage inductance of the high frequency transformer (and/or with additional inductance) and the DC link capacitor of the direct AC inverter. The low frequency modulated, e.g. half sinusoidal, DC voltage at the DC link of the direct AC inverter is unfolded to obtain the ultimate low frequency AC output. Three-phase AC voltage can be obtained with three sets of the circuit depicted in FIG. 5.

Two approaches can be use to implement the desired AC output. These include 1) high frequency direct AC inversion at the secondary side of the transformer 24; or 2) separate DC to AC inversion taking the common DC bus 25 as input. FIG. 5 illustrates a direct AC inversion 100 to generate a single-phase AC voltage, which results from a sinusoidal high frequency modulated waveform at the transformer and filtering action with leakage inductance of the high frequency transformer (and/or with additional inductance) and the DC link capacitor of the direct AC inverter. The low frequency modulated, e.g. half sinusoidal, DC voltage at the DC link of the direct AC inverter is unfolded to obtain the ultimate low frequency AC output. Three-phase AC voltage can be obtained with three sets of the circuit 100 depicted in FIG. 5.

Figure 6:
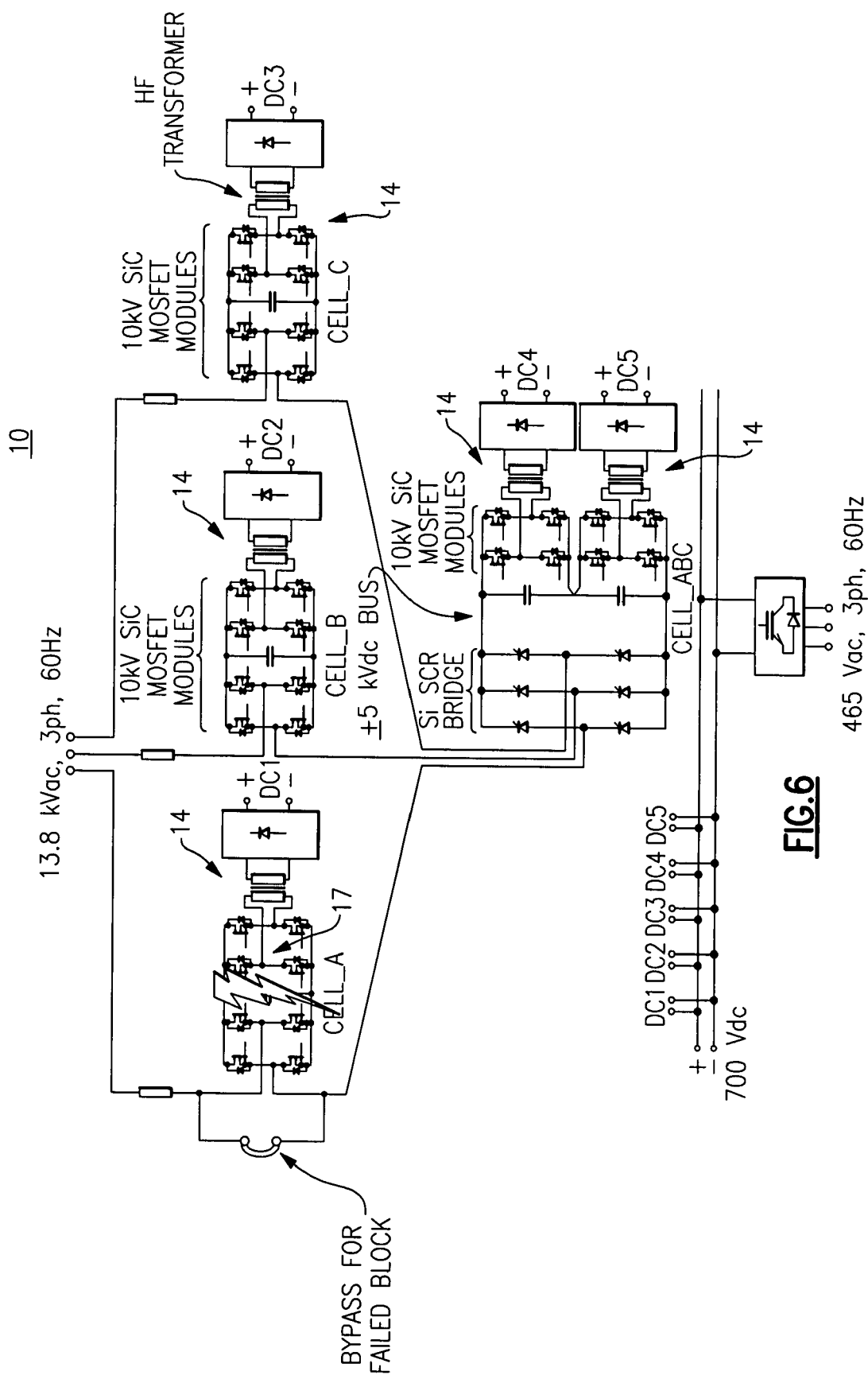
FIG. 6 is a high level diagram illustrating the power conversion system using a plurality of DC-DC power converters shown in FIG. 3, in which a SiC bridge has failed in one of the DC-DC converters and the failed cell is bypassed.

Looking now at FIG. 6, a high level diagram illustrates the power conversion system 10 using a plurality of DC-DC power converters 14 shown in FIG. 3, in which a SiC bridge 17 has failed in one of the DC-DC converters 14, and the failed cell is bypassed.

Figure 7:
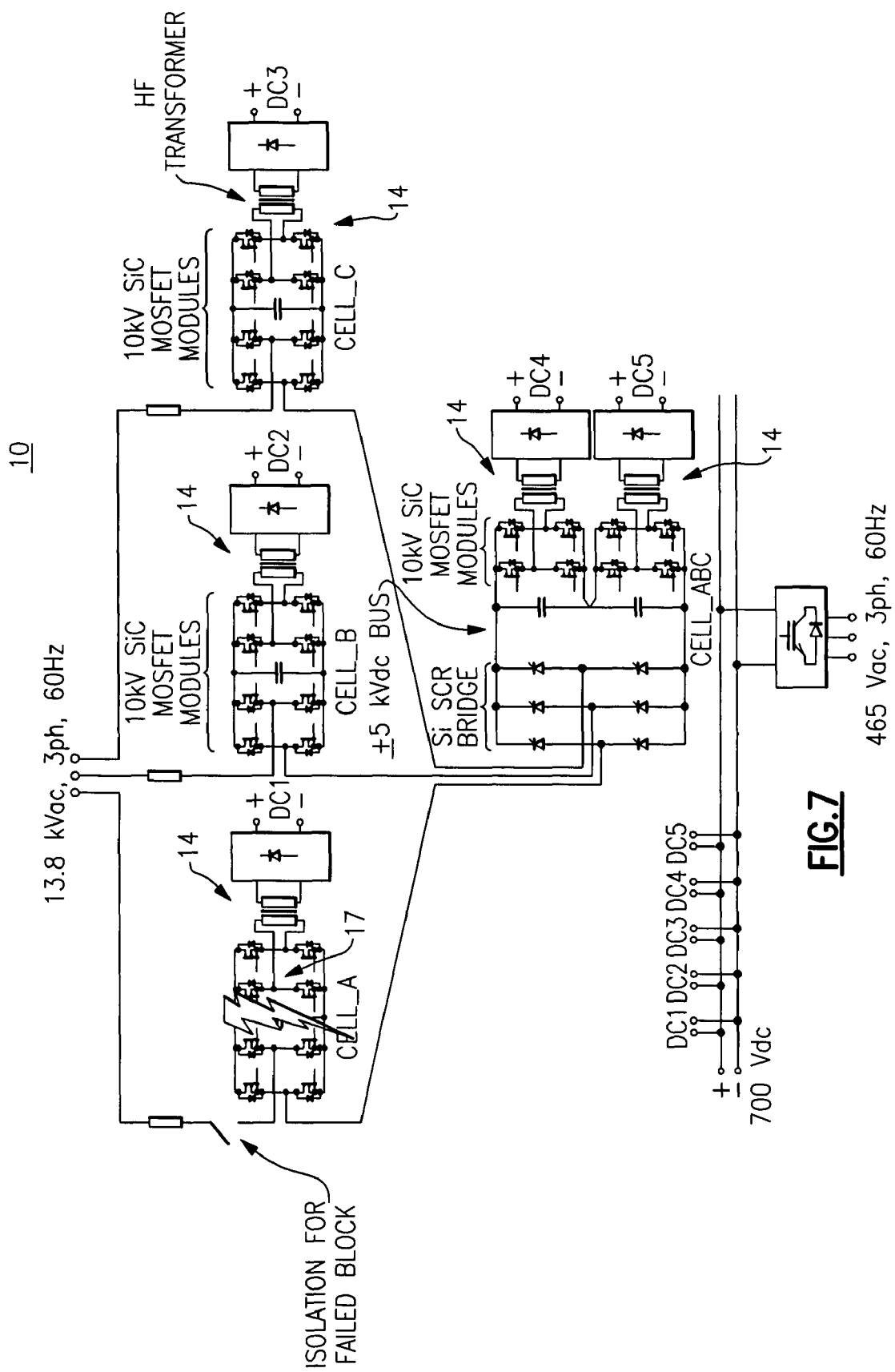
FIG. 7 is a high level diagram illustrating the power conversion system using a plurality of DC-DC power converters shown in FIG. 3, in which a SiC bridge has failed in one of the DC-DC converters and the failed cell is disconnected.

FIG. 7 is a high level diagram illustrating the power conversion system 10 using a plurality of DC-DC power converters 14 shown in FIG. 3, in which a SiC bridge 17 has failed in one of the DC-DC converters 14, and the failed cell is disconnected.

Figure 8:
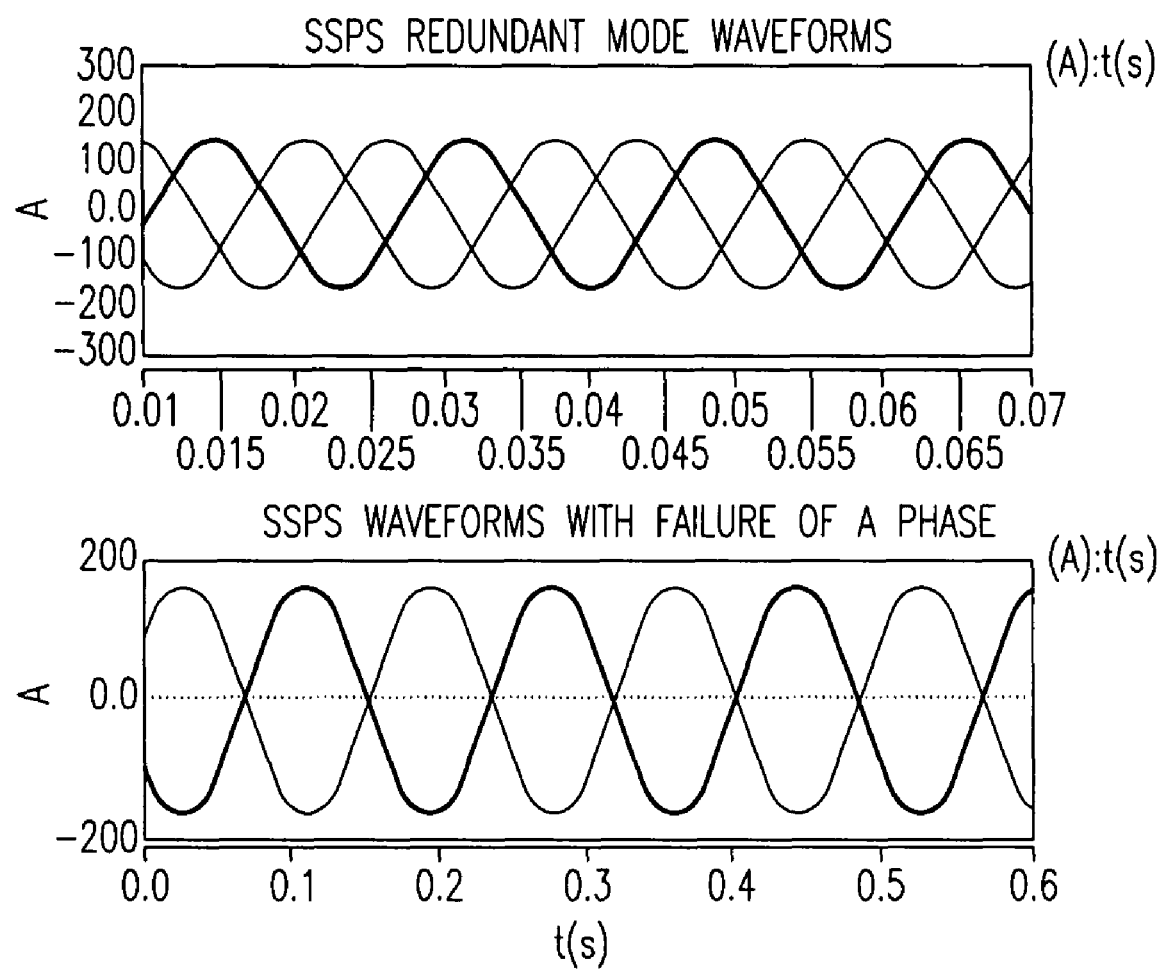
FIG. 8 is a waveform diagram illustrating line current waveforms for the two operating modes when a SiC fails as shown in FIGS. 6 and 7 respectively in which the top waveform corresponds to FIG. 6 and the bottom waveform corresponds to FIG. 7.

FIG. 8 is a waveform diagram illustrating line current waveforms for the two operating modes when a SiC fails as shown in FIGS. 6 and 7 respectively in which the top waveform corresponds to the condition shown in FIG. 6 and the bottom waveform corresponds to the condition shown in FIG. 7. All three phases A, B, C are still connected to the grid and can draw current during the operating condition depicted in FIG. 6, while no current is flowing in the isolated phase A depicted in FIG. 7.

Figure 9:
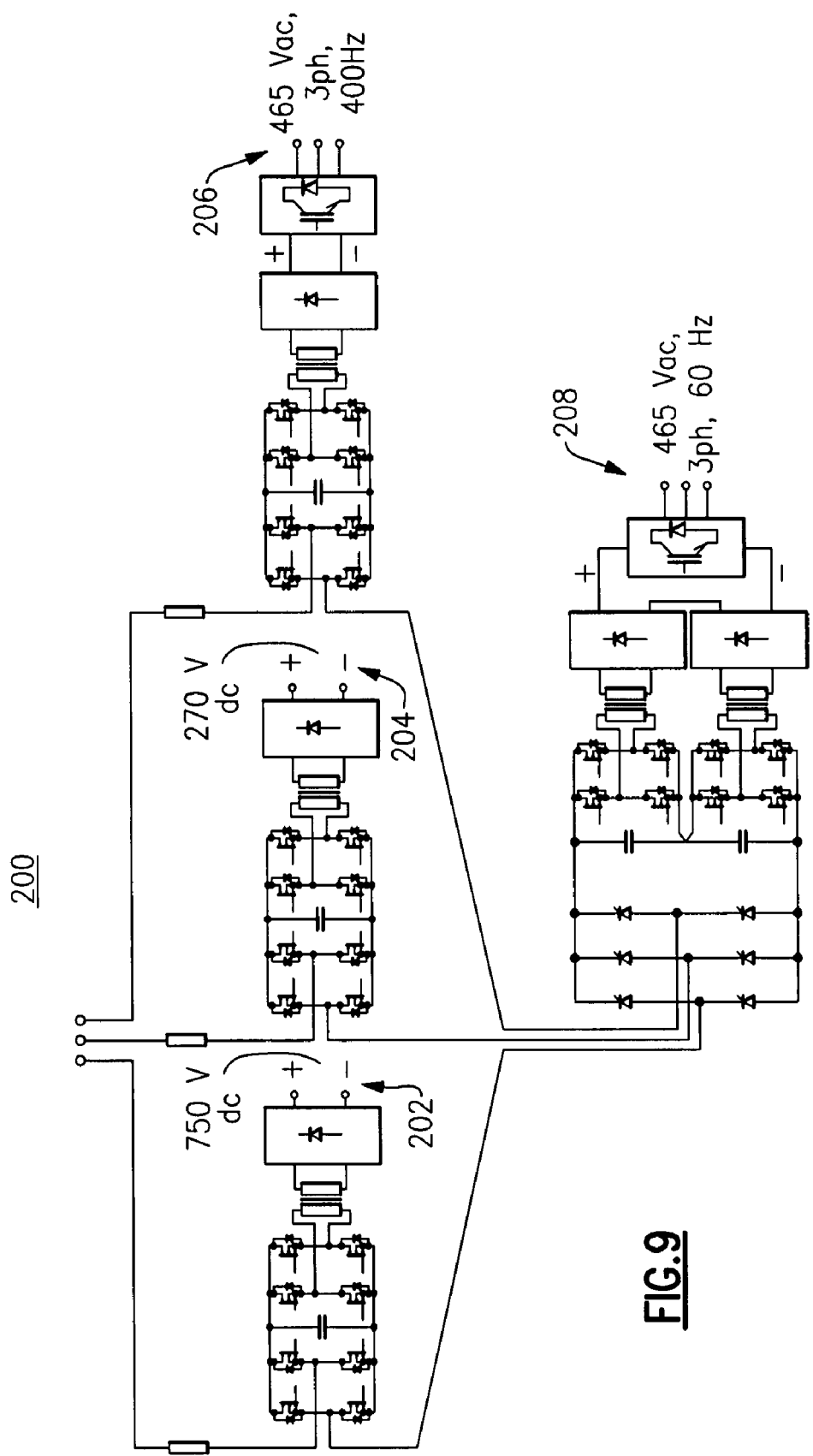
FIG. 9 is a block diagram illustrating a power conversion system with a mixed type output according to one embodiment of the present invention.

FIG. 9 is a block diagram illustrating a power conversion system 200 with a mixed type output according to one embodiment of the present invention. The power conversion system 200 corresponds to the power conversion system 10, but now is also configured to provide different level DC voltage outputs 202, 204 and different frequency AC voltage outputs 206, 208. Although three phase AC is depicted, single phase AC or any other desired combination of AC and DC voltages can just as easily be provided using appropriate configurations.

In summary explanation, a modular DC-DC converter 14 provides a form and fit replacement for a conventional iron core transformer. The DC-DC converter 14 includes modular soft-switched SiC MOSFET H-bridges 17, each coupled to its own high-voltage DC bus from an AC-DC stage 12. In one embodiment, each DC-DC converter 14 converts a high voltage DC link voltage to a common DC voltage through an associated high frequency galvanic isolation transformer and low voltage rectifier. The DC-DC converters 14 are controlled in a way that (a) input ripple power from the SiC H-bridges 18 in each phase of the AC-DC stage 12 is canceled at a common DC bus to minimize high-voltage DC link capacitance; and (b) interleaving of multiple threads cancels the switching frequency ripple so that the output filter can be minimized. (c) Soft-switching of DC-DC power converters 14 can be achieved through phase shifted, soft-switching PWM H-bridges. Another embodiment employs direct AC inversion to produce a desired AC output from the AC link resulting in maximum power density and efficiency.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A galvanic isolated DC-DC or DC-AC power conversion system coupled to a plurality of non-isolated DC sources which are derived from a combination of a plurality of single-phase and three-phase AC-DC rectifiers, each single-phase and three-phase AC-DC rectifier feeding a galvanically isolated DC-DC converter configured with a high frequency transformer to provide intermediate stage galvanic isolation.

2. The galvanic isolated DC-DC or DC-AC power conversion system according to claim 1, wherein each galvanically isolated DC-DC converter is controlled to provide a constant DC output.

3. The galvanic isolated DC-DC or DC-AC power conversion system according to claim 1, wherein switching patterns of the galvanically isolated DC-DC converters cause interleaving of parallel DC-DC converter signals to minimize electromagnetic interference.

4. The galvanic isolated DC-DC or DC-AC power conversion system according to claim 1, wherein each galvanically isolated DC-DC converter is controlled to transfer ripple power at twice the fundamental frequency of a respective upstream single-phase AC-DC rectifier, such that DC link capacitors employed to buffer the ripple can be minimized.

5. The galvanic isolated DC-DC or DC-AC power conversion system according to claim 1, wherein each galvanically isolated DC-DC converter is configured with a phase-shifted, soft-switching PWM bridges to reduce associated semiconductor device switching stresses.

6. The galvanic isolated DC-DC or DC-AC power conversion system according to claim 1, wherein each galvanically isolated DC-DC converter is configured with semiconductor switches that operate in a synchronous rectification or bidirectional mode to allow reduction of semiconductor components and conduction losses.

7. The galvanic isolated DC-DC or DC-AC power conversion system according to claim 1, wherein any galvanically isolated DC-DC converter associated with an internal or external fault is isolated or bypassed, with controls of the remaining galvanically isolated DC-DC converters readjusted to allow continued operation of the power conversion system.

8. The galvanic isolated DC-DC or DC-AC power conversion system according to claim 1, wherein each galvanically isolated DC-DC converter comprises silicon semiconductors or silicon-carbide semiconductors or mix of SiC and Si power semiconductors that provide high frequency or high temperature operation.

9. The galvanic isolated DC-DC or DC-AC power conversion system according to claim 1, wherein each or some galvanically isolated DC-DC converters are controlled to provide a half-sinusoidal DC voltage waveform at a DC link of a direct AC inverter that results from a sinusoidal high frequency modulated waveform at a high frequency transformer and filtering action with leakage inductance of the high frequency transformer and/or with additional inductance and a DC link capacitor of the direct AC inverter.

10. The galvanic isolated DC-DC or DC-AC power conversion system according to claim 1, wherein the plurality of DC sources are configured to feed a common DC output through the galvanically isolated DC-DC converters that are configured in parallel at a common DC output.

11. The galvanic isolated DC-DC or DC-AC power conversion system according to claim 10, wherein the common DC output of the galvanically isolated DC-DC converters is further coupled to a DC-AC inverter to provide single-phase or three-phase AC power.

12. The galvanic isolated DC-DC or DC-AC power conversion system according to claim 11, wherein switching patterns of the galvanically isolated DC-DC converters cause interleaving of parallel DC-DC converter signals to minimize electromagnetic interference and switching ripple at the common DC output with reduced filtering needs.

13. The galvanic isolated DC-DC or DC-AC power conversion system according to claim 11, wherein each galvanically isolated DC-DC converter is controlled to transfer ripple power at twice the fundamental frequency from a respective upstream single-phase AC-DC rectifier, such that DC link capacitors employed to buffer the ripple can be minimized.

14. The galvanic isolated DC-DC or DC-AC power conversion system according to claim 11, wherein the galvanically isolated DC-DC converters employ phase-shifted, soft-switching PWM bridges to reduce switching stresses in associated semiconductor devices.

15. The galvanic isolated DC-DC or DC-AC power conversion system according to claim 11, wherein the galvanically isolated DC-DC converters employ semiconductor switches in a synchronous rectification or bidirectional mode to allow reduction of semiconductor components and conduction losses.

16. The galvanic isolated DC-DC or DC-AC power conversion system according to claim 11, wherein the galvanically isolated DC-DC converters comprise silicon semiconductors or silicon-carbide semiconductors or mixed SiC and Si power switches that provide high frequency and/or high temperature operation.

17. The galvanic isolated DC-DC or DC-AC power conversion system according to claim 11, wherein any galvanically isolated DC-DC converter associated with an internal or external fault is isolated or bypassed, with controls of the remaining galvanically isolated DC-DC converters readjusted to allow continued operation of the power conversion system.

18. The galvanic isolated DC-DC or DC-AC power conversion system according to claim 1, wherein each galvanically isolated DC-DC converter is controlled to provide a constant DC output or a half-sinusoidal DC voltage waveform at a DC link of a direct AC inverter such that the power conversion system provides mixed type outputs selected from mixed frequency and/or mixed voltage levels.

19. The galvanic isolated DC-DC or DC-AC power conversion system according to claim 18, wherein the mixed frequency output frequencies are selected from DC, 50 Hz, 60 Hz, and 400 Hz.

20. A galvanic isolated DC-DC or DC-AC power conversion system coupled to a plurality of non-isolated DC sources which are derived from a combination of three single-phase and three-phase AC-DC rectifiers, wherein the single-phase and three-phase AC-DC rectifiers together comprise a mixed silicon-carbide (SiC) and silicon (Si) device topology, each single-phase and three-phase AC-DC rectifier feeding a galvanically isolated DC-DC converter configured with a high frequency transformer to provide intermediate stage galvanic isolation.

21. The galvanic isolated DC-DC or DC-AC power conversion system according to claim 20, wherein each galvanically isolated DC-DC converter is controlled to provide a either constant DC or desired frequency AC modulated DC voltage output, and further wherein each galvanically isolated DC-DC converter comprises all SiC or mixed SiC and Si devices.

22. A galvanic isolated DC-DC or DC-AC power conversion system coupled to a plurality of non-isolated DC sources which are derived from a combination of a plurality of single-phase and three-phase AC-DC rectifiers, each single-phase and three-phase AC-DC rectifier feeding a galvanically isolated DC-DC converter configured with a high frequency transformer to provide intermediate stage galvanic isolation, wherein each galvanically isolated DC-DC converter comprises a pulse width modulated MOSFET H-bridge with all silicon-carbide (SiC) power switches or mixed SiC and Si power switches.

23. The galvanic isolated DC-DC or DC-AC power conversion system according to claim 22, wherein each galvanically isolated DC-DC converter comprises all SiC or mixed SiC and Si devices.

\* \* \* \* \*